3,070,428
PROCESS FOR REPRODUCING
NEGATIVE IMAGES
Abraham Bernard Cohen, Springfield, N.J., assignor to E. I. du Pont de Nemours and Company, Wilmington, Del., a corporation of Delaware
No Drawing. Filed Aug. 18, 1959, Ser. No. 834,419
9 Claims. (Cl. 41—41)

This invention relates to a new process for the preparation of negative images. More particularly it relates to the preparation of right reading negatives by a thermal process. Specifically the invention relates to a process for the preparation of a right reading negative by heating a sheet of a thermally sensitive material while in contact with a metal relief image.

Many techniques have been developed for the preparation of negatives from metal engravings. These techniques, however, are time consuming and costly. The most commonly used conversion methods include:

(1) *Opaque "repro" proof.*—In which ink impression of the relief printing form is made on paper and the printed image is photographed in a process camera to yield a negative image corresponding to the relief surface. To prepare a right reading negative two additional contact photographic steps are required or the image reversal must be accomplished optically in a camera. The process suffers from loss of fidelity due to ink squeeze-out during the printing of the proof. Ink squeeze-out results in the tendency of characters to be slightly bolder than the original.

(2) *Transparent "repro" proof.*—This technique is similar to the opaque repro proof method described above except that the image is printed on thin, transparent plastic, e.g., cellophane. The print is a transparent positive of the relief surface. Only contact photography is involved to obtain a negative but ink squeeze-out remains a problem.

(3) *Ink impression on a photographic film.*—An ink impression is made on the emulsion side of a high contrast photographic film, the image acting as a light stencil or a development resist. All the problems of pulling a precise proof exist, and in addition, the operation must be carried out in safelight conditions.

(4) *"Britetype" Photography (Ludlow-Typograph Co., 2032 Clybourn Avenue, Chicago 14, Illinois).*—A relief plate is completely blackened by coating with carbon black. The printing surface is then cleaned to expose the metal relief image, and the treated plate is photographed with a camera fitted with a broad light source designed to eliminate specular reflection. The resulting positive is used to make a contact negative. Fidelity by this process is excellent. The process has been described in the periodical Book Production, July 1958, and in U.S. Patents 2,609,293, 2,704,410 and 2,751,294, issued to G. L. Morrison.

An object of this invention is to provide a process for preparing right-reading negative images which is simpler than those described above. Another object is to provide such a process which gives such images which are of high quality. Yet another object is to provide such a process which is dependable, can be carried out by the ordinary technician and uses conventional, available equipment. A further object is to provide such a process which can be carried out in a relatively short time. Still further objects will be apparent from the following description of the invention.

The above objects are attained in accordance with the process of making right-reading negative images of this invention which comprises placing in intimate contact with the relief or outer coplanar surface of a metal relief printing plate the thermally-sensitive surface of a thermally-sensitive image recording or copy element, e.g., a film or paper, heating the reverse surface of said element for a period of about 0.1 to 60 seconds at a temperature sufficient to form an image, which is usually in the range 50° C. to 250° C., and then removing the image recording element from the printing plate. Image formation, e.g., darkening, occurs by chemical change only in the areas of the recording element that are not in contact with the metal relief. The relief portions in contact with the thermally sensitive material act as heat conductors thereby maintaining the temperature in those areas below the thermal sensitivity point. The resulting right-reading negative can be read normally, i.e., from left to right, when the image containing surface of the negative is held toward the viewer.

An exemplary procedure will now be described.

A sheet of polyethylene terephthalate, 0.5-mil in thickness, is coated with a thermally sensitive layer, preferably prepared from 3-cyano-4,5-dimethyl-5-hydroxy-3-pyrrolin-2-one and cupric acetate by the procedure described in the application of Holland-Wayrynen, Serial No. 807,761, filed April 21, 1959. The dry coating weight of the thermally sensitive material can range from 47 to 200 mg./dm.$^2$, but preferably is 100 mg./dm.$^2$. The thermally active surface is placed face down on the surface of a metal relief printing plate, e.g., a zinc engraving, and the thermally sensitive film is heated through its base support, preferably for 3 to 5 seconds at a temperature range of 160 to 170° C. Preferably a preheated roller is used to reach the activation temperature, but other heating methods can be used provided the thermally sensitive film and the relief images are in intimate contact. A right-reading negative image is obtained, i.e., those areas not in contact with the metallic relief images turned black. The negative image is fixed in water and then can be used for the purposes hereinafter described.

The preparation of the substituted 5-hydroxy-3-pyrrolin-2-one thermographic materials and activators is disclosed in the aforedesignated Holland-Wayrynen application. Other thermographic image-recording films and papers which can be used in the process of this invention in place of the thermally sensitive film described above include those described in U.S. Patents 2,637,657; 2,663,654 through 2,663,657, 2,681,277, 2,740,896, 2,749,253, 2,813,042, 2,609,293, 2,624,700, 2,704,410 and 2,751,294.

The invention will be further illustrated by but is not intended to be limited to the following examples.

*Example I*

An 8-inch by 10-inch sheet of polyethylene terephthalate photographic film base, 4-mils in thickness, was coated to a dry coating weight of 100 mg./dm.$^2$ with a thermally sensitive solution containing 608 mg. of 3-cyano-4,5-dimethyl-5-hydroxy-3-pyrrolin-2-one, 5 ml. of 0.3 M Cu(CH$_3$COO)$_2$·H$_2$O and 15 ml. of polyvinyl alcohol (3.33% by weight) (9.9% hydrolyzed, viscosity of 4% aqueous solution 45–55 centipoises at 20° C.). The dried, coated film was placed face down on the surface of a zinc engraving, and the film was heated for 5 seconds through the film base support by means of a hot, flat surface preheated to 165 to 170° C. A right reading negative image was formed that was black in the areas which were not in contact with the engraving reliefs and clear in the areas which were in contact with the engraving image. The negative image which was sharp and finely defined was fixed by washing in water for 30 seconds. The negative image, after drying, was placed over a photopolymerizable printing element prepared as described in Example 4 of the application of Martin et al., Serial No. 596,766, filed July 9, 1956 (U.S. Patent 2,927,022, March 1, 1960). The element and negative were placed in a vacuum frame and the system was exposed to 1.75 watts of actinic radiation per square inch for 12 seconds from an 1,800-watt, high-pressure, mercury-arc lamp. After exposure, the unexposed areas of the element were removed by spray washing for 8 minutes using an 0.08 N aqueous solution of NaOH. A sharp, photopolymerized relief printing plate was obtained, the reliefs corresponding to the clear areas of the negative and of the image areas of the original engraving. The printing plate was used for printing in a flat press and good reproductions were obtained of a quality comparable with those obtained from the original metal engraving.

*Example II*

An 8-inch by 10-inch sheet of polyethylene terephthalate photographic film base as described in Example I was coated with the thermographic solution as described in that example. A piece of the dried film was placed face down on the surface of a copper engraving. A flexible cover sheet of polyethylene terephthalate out of which had been cut a 2-inch by 2-inch segment which was replaced by aluminum foil, was placed directly over the reverse of the thermally sensitive film. A vacuum was applied to the system to insure intimate contact between the engraving surface and the thermosensitive film. The aluminum area was heated for 15 seconds with a hot, flat surface at a temperature of 160 to 170° C. The thermosensitive coating became black in the areas not in contact with the engraving forming a negative image of the engraving. When the negative was used to expose a photopolymerizable printing element by the procedure described in Example I a well defined relief image was obtained which corresponded to the relief areas of the original engraving.

*Example III*

Example II was repeated except that the cover sheet with the aluminum area over the thermosensitive coated film was heated for 15 seconds by means of a roller ¾ inch in diameter which had been preheated to 300° C. in a gas flame. The negative image which formed in the areas not in contact with the zinc engraving were very sharp. A good relief image printing plate was obtained when the photopolymerizable element described in Example I was exposed and the unexposed areas washed out as described in that example.

*Example IV*

A 4-inch by 12-inch strip of polyethylene terephthalate film base, 0.5 mil in thickness, was coated with the thermographic solution as described in Example I. The coated strip was placed coated side down on a zinc engraving and the engraving and thermosensitive film were placed in a "Premier Model 19 Thermo-Fax" (Minnesota Mining and Manufacturing Co.) thermographic copying machine. Over the base surface of the thermosensitive film was placed a sheet of black, flexible paper. The machine was closed and the system was exposed for 1, 2 and 3 passes (0.91 inch per second). The thermosensitive film was deep blue after the first pass. At two passes the image became black and a sharp image was obtained. No change was noted after the third pass of the light.

*Example V*

Example IV was repeated except that the film base material on which the thermosensitive layer was coated was polyethylene terephthalate photographic film base, 4-mils in thickness, which had been treated for approximately 5 seconds in a bath consisting of 15 g. of $Na_2Cr_2O_7 \cdot 2H_2O$ and 200 ml. of concentrated $H_2SO_4$ (95 to 98% acid, S.G. 1.8407–1.8437 at 60° F.) and immediately washed in water. The coated film was placed coated side down on the zinc engraving and then placed in the "Premier Model 19 Thermo-Fax" machine described in Example IV. When subjected to 1, 2 and 3 passes (0.91 inch per second) a satisfactory black color negative image was obtained after 3 passes of the machine light source.

The instant invention is not limited to the particular thermosensitive material that can be used. Any material that undergoes a thermal change in the temperature range of about 50 to 250° C. or more in a period of about 0.1 to 60 seconds is useful. The thermal change, however, preferably is pronounced, i.e., the color should change from white or a light color to a dark color, preferably black. Thermal changes to lighter colors are satisfactory if appropriate light filters are used when the negative is used to expose a printing plate, e.g., a photopolymerizable printing plate. The negative images, however, to be useful in the printing industry must have sharp, well defined areas and consist solely of substantially opaque and substantially transparent areas. A preferred thermosensitive composition is the 3 - cyano - 4,5 - dimethyl - 5 - hydroxy - 3 - pyrrolin-2-one activated with cupric acetate disclosed in the application of Holland and Wayrynen, Serial No. 807,761, filed April 21, 1959. Other 5-hydroxypyrrolinones disclosed therein are also useful as are thermographic materials disclosed in the U.S. patents listed above and in assignee's Howard U.S. application Ser. No. 770,012, filed October 28, 1958, U.S. Patent 2,950,987, August 30, 1960.

The thermosensitive materials are preferably coated on transparent film bases. The optimum coating weights vary with the covering power of the particular thermosensitive material used. The coating weight of the preferred material can vary from 47 to 200 mg./dm.$^2$, preferably 100 mg./dm.$^2$. The coatings can be applied to the film base by roll coating, dip coating and extrusion coating from extrusion hoppers. Air knives or jets can be used with such coating devices to get thin, uniform coatings. Suitable film base supports, in addition to the preferred polyethylene terephthalate, of various thicknesses, e.g., 0.5-mil to 4-mils, include cellulose esters, e.g., cellulose acetate and triacetate, cellulose, propionate, cellulose butyrate; films of various film-forming synthetic resins or high polymers, e.g., polystyrene, vinylidene chloride polymers, e.g., vinyl chloride copolymers with vinyl chloride, vinyl acetate, styrene, isobutylene and acrylonitrile; and vinyl chloride copolymers with the latter polymerizable monomers; the linear condensation polymers such as the polyesters and treated polyesters, e.g., by chromic acid, the polyamides, e.g., polyhexamethylene adipamide/adipate, etc. Regenerated cellulose fibers can also be used. The film bases must be stable, however, in the temperature range used.

Suitable metals for the relief image plate include zinc, copper, aluminum, magnesium, steel, nickel, chrome, brass, type metal, etc. The system can be heated by means well known in the art, e.g., preheated rollers, flat heating surfaces, radiant sources, e.g., heating lamps, and thermal machines such as "Thermo-Fax" thermographic copying machines manufactured by Minnesota Mining and Manufacturing Company. The metal printing plate may be a line or halftone or may contain both line and halftone areas.

After the negative image is obtained it is fixed by dipping in water. Dilute mineral acids, e.g., 0.1 M hydrochloric acid, are also useful as fixing agents. The excess acid should be removed by washing with water prior to the use of the negative.

The instant process is useful to prepare good quality right reading negative images from existing metallic relief printing forms. The negative images so formed are useful as image transparencies in the exposure of photopolymerizable printing plates such as are described in Plambeck U.S. Patent 2,791,504. The negative images are also useful in lithographic printing and for the preparation of slides. A reproduction of the original engraving can be prepared by use of the right reading negative prepared as described in the present invention.

The instant invention results in high fidelity right reading negative images being obtained by a simple, inexpensive process in less than 15 minutes. The instant conversion method requires no expensive equipment, e.g., cameras or printing presses, as do the current conversion techniques, and it accomplishes the conversion in a much shorter period of time. Still other advantages will be apparent to those skilled in the art.

What is claimed is:

1. A process which comprises placing in heat conductive contact with the unheated relief surface of a metal printing relief the thermally-sensitive, image-forming surface of a thermally-sensitive image-recording element, the thermally-sensitive material of which undergoes thermal change at a temperature from about 50° C. to 250° C. in a period of about 0.1 to 60 seconds, applying heat to the reverse surface of said element from the direction of its reverse surface toward the surface of the relief for a period of about 0.1 to 60 seconds at a temperature within the range from about 50° C. to about 250° C. while said surfaces are in contact, whereby a color change occurs in areas not contacting said metal relief, and removing the element from the metal relief.

2. A process according to claim 1 in which a separate flexible, infrared absorbing element is placed in contact with the thermally-sensitive element prior to the heating step.

3. A process according to claim 1 wherein the metal printing relief has a flat surface and heat is applied by means of a hot flat surface.

4. A process as set forth in claim 1 in which the heat is applied by radiation.

5. A process as set forth in claim 1 wherein said element has a flexible paper base.

6. A process as set forth in claim 1 wherein said element has a flexible transparent polymeric hydrophobic film base.

7. A process as set forth in claim 1 wherein the thermally-sensitive image-bearing surface contains a mixture of 3-cyano-4,5-dimethyl-5-hydroxy-3-pyrrolin-2-one and cupric acetate, and the image is fixed.

8. A process as set forth in claim 1 wherein the metal relief is a halftone.

9. A process as set forth in claim 1 wherein the metal relief contains halftone areas and line areas.

References Cited in the file of this patent

UNITED STATES PATENTS

| | | |
|---|---|---|
| 2,680,062 | Sus | June 1, 1954 |
| 2,919,349 | Kuhrmeyer | Dec. 29, 1959 |
| 2,950,987 | Howard | Aug. 30, 1960 |

FOREIGN PATENTS

| | | |
|---|---|---|
| 17,694 | Great Britain | of 1890 |

OTHER REFERENCES

Prater: Cavity Reflex Printing, IBM Technical Disclosure, one page bulletin, vol. 1, No. 6, April 1959.